United States Patent
Matiere

[11] Patent Number: 5,180,254
[45] Date of Patent: Jan. 19, 1993

[54] FLUID-CONVEYING CONDUIT

[76] Inventor: Marcel Matiere, 17 Avenue Aristide Briand, 15000 Aurillac, France

[21] Appl. No.: 772,242

[22] Filed: Oct. 7, 1991

Related U.S. Application Data

[63] Continuation of Ser. No. 507,232, Apr. 10, 1990, Pat. No. 5,061,121.

[30] Foreign Application Priority Data

Apr. 10, 1989 [FR] France ................................ 89 04692

[51] Int. Cl.⁵ .......................... F16L 1/028; F16L 9/22
[52] U.S. Cl. .................................... 405/155; 138/105; 138/157; 405/154
[58] Field of Search ............... 405/124, 126, 134, 135, 405/154, 155, 157; 138/105, 155, 156, 157, 171, 175, 176

[56] References Cited

U.S. PATENT DOCUMENTS

| | | | |
|---|---|---|---|
| 109,886 | 12/1870 | Freeman | 405/126 |
| 1,845,836 | 2/1932 | Hauser | 138/157 X |
| 1,987,517 | 1/1935 | Porter et al. | 138/157 X |
| 2,702,564 | 2/1955 | Busch | 138/48 |
| 3,494,381 | 2/1970 | Fork | 138/157 X |
| 4,314,775 | 2/1982 | Johnson | 405/155 |
| 4,563,107 | 1/1986 | Peterson | 405/124 |
| 5,061,121 | 10/1991 | Matiere | 405/155 |

FOREIGN PATENT DOCUMENTS 0244890 11/1987 European Pat. Off. .

*Primary Examiner*—David H. Corbin
*Attorney, Agent, or Firm*—Pollock, Vande Sande & Priddy

[57] ABSTRACT

A fluid-conveying conduit of large cross section for conveying fluid under high pressure, formed by assembling on a laying surface a plurality of prefabricated longitudinal elements placed in sequence and comprising, in transverse section, a lower base and a vault having two lateral edges connected to the base by sealingly joining longitudinal members. The longitudinal joining members consist of two parallel metallic profiled members rigidly connected to one another by at least one crosspiece and fixed to a slab forming the base of the conduit, and the vault consists of at least one thin wall element and is sealingly fixed by its two lateral edges along two longitudinal profiled members.

22 Claims, 6 Drawing Sheets

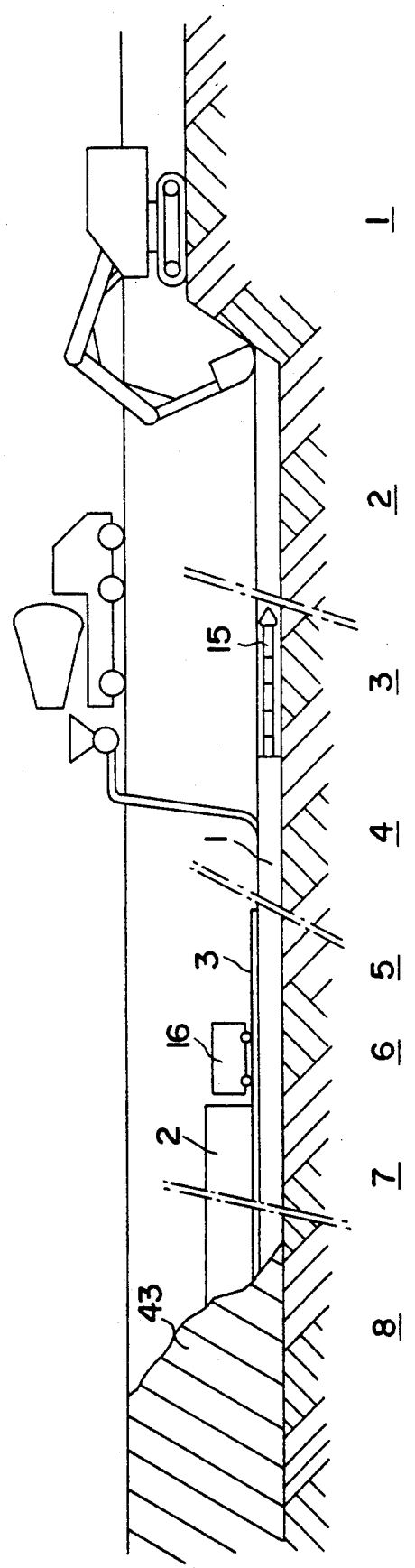
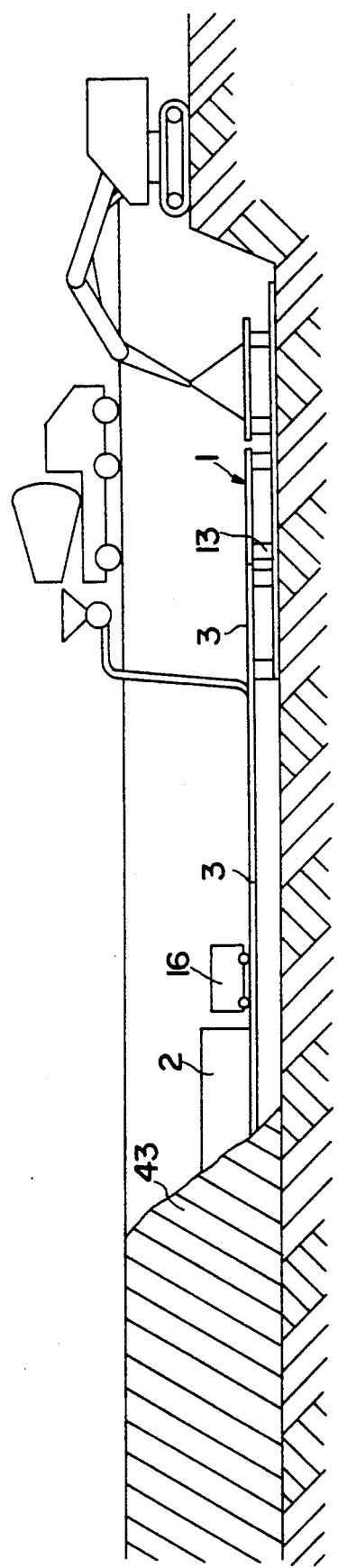

FLUID-CONVEYING CONDUIT

This is a continuation of application Ser. No. 07/507,232, filed Apr. 10, 1990, now U.S. Pat. No. 5,067,121.

FIELD OF THE INVENTION

The invention relates to a fluid-conveying conduit of large cross section, formed by assembling on a laying surface a plurality of prefabricated longitudinal elements forming sections placed one behind the other in a longitudinal direction. The invention applies more especially to the construction of conduits for conveying fluid under a high pressure which may, for example, exceed 10 bars and which is useable in particular for the construction of effluent disposal or water conveyance or forced conduit systems for hydroelectric plants.

The invention also embraces certain particularly advantageous processes for the construction of conduits under pressure.

BACKGROUND OF THE INVENTION

Conduits under pressure of large cross section, for example forced conduits, are often constructed using sections of metallic tubes, of circular transverse section, placed one behind the other and sealingly connected in a manner which makes it possible to withstand the pressure. The tube may consist of simple arched ferrules assembled by welding or, in order to withstand great pressures, it may consist of a thick cast wall. The tubular elements are then provided at their ends with members for joining by fitting together or with flanges applied onto one another by clamping means with interposition of leaktight seals.

In order to effect the welds under good conditions, the wall must not be too thick and above all the tubes must be properly aligned. The means for joining by fitting together permit the tolerance of certain disalignments, but within relatively narrow limits. Moreover, it is difficult to construct thick-walled metallic tubes having very large sections and, in practice, the diameter of such conduits does not exceed 56 inches, which corresponds to about 1.5 m².

In order to obtain larger cross sections, it is possible to use tubes made of reinforced or prestressed concrete, but such elements are extremely heavy and bulky and, for very large sections, their transportation and installation become very difficult. In addition, the concrete tubes are only able to withstand relatively low pressures.

Moreover, when a conduit of circular section is buried in the ground, it rests essentially along the lower generatrix, which is therefore highly loaded. It is also possible to support a metallic conduit on appropriately shaped cradles, but the latter have to be spaced apart from one another and the conduit is therefore subjected to bending stresses.

The applicant has already proposed a novel embodiment for buried conduits using prefabricated elements whose dimensions remain within the limits permitting road transportation and which may be assembled on site. Such arrangements, which form the subject, for example, of European Patents Nos. 081,402 and 0,188,487 by the same inventor, permit the construction of hollow tubular structures of very large sections which may, if desired, be used to convey fluids provided there is an appropriate leaktight lining. However, such embodiments entail handling elements of very large dimensions and of great weight, and it is relatively difficult to achieve, on laying, perfect alignment of these elements in order to ensure sufficient leaktightness at elevated pressures.

SUMMARY OF THE INVENTION

The object of the invention is to provide novel arrangements which make it possible to solve all of the transportation, installation and alignment problems with regard to the construction of fluid-conveying conduits which may have very large dimensions, for example a cross section which may exceed 10 m², and which are capable of withstanding pressures possibly greater than 10 bars.

The invention therefore relates, in a general way, to the construction of conduits formed by assembling, on a laying surface, a plurality of prefabricated longitudinal elements forming sections placed one behind the other in a longitudinal direction and comprising, for each section, at least one lower element forming a base which rests on the laying surface and at least one upper element forming a vault which has two lateral edges connected to the base by sealingly joining longitudinal members.

According to the invention, for each conduit section, the longitudinal joining elements consist of two parallel metallic profiled members rigidly connected to one another by at least one crosspiece for maintaining the space between them and fixed on a slab which forms the bottom of the conduit and rests on the laying surface, and the vault consists of at least one thin wall element and is sealingly fixed by its two lateral edges on the two longitudinal profiled members, the facing ends of the slab and of the vault of the two adjacent sections being sealingly fixed in such a manner as to ensure continuity of the conduit and resistance to pressure when in operation.

In a first, embodiment, the slab is sufficiently rigid in itself to form a crosspiece for maintaining the space between the profiled members. The slab may, for example, take the form of a thick metallic plate, or may be made of reinforced and/or prestressed concrete, the profiled members being welded on the metallic plate or sealed in the upper face of said slab. The latter may be poured in situ or may consist of a prefabricated element produced by molding in the workshop.

When the slab is of concrete, it may be covered by a thin wall extending between the two profiled members and forming a sealing skin. In this case, the two profiled members may be connected to one another beforehand by rigid crosspieces so as to form a joining assembly which is sealed in the concrete slab.

The two profiled members may, however, also be sealed in at least two reinforced concrete beams which form, on the one hand, the crosspieces for maintaining the space between them and, on the other hand, stands for positioning the base of the conduit, it being possible for said beams, after laying, to be embedded in concrete poured in situ.

In a particular embodiment, each longitudinal profiled joining member consists of an angle bracket comprising a substantially horizontal wing for fixing on the slab and a wing directed tangentially to the lateral edge of the vault.

In another embodiment, each profiled joining member consists of a substantially planar sheet metal plate, one part of which is embedded in the concrete part of the slab and the other part of which is oriented in such a direction as to form the springing line of the vault.

According to a further embodiment, the crosspiece consists of a rectangular metallic plate having two lateral edges parallel to the longitudinal axis, on which edges there are disposed, respectively, two upwardly concave grooves which form the longitudinal profiled members for joining to the vault, the latter being provided along its two lateral edges, respectively, with two flanges having a profile opposite to that of the grooves and capable of engaging in the latter with interposition of a leaktight seal, each flange being associated with clamping means distributed over its entire length and bearing on one side against the flange and on the other side against the slab.

The conduit thus formed may be constructed in different ways.

In a particularly constructional embodiment, after preparing a flat laying surface at the desired level, the reinforcements of a slab are laid on longitudinal profiled members, rigidly connected to one another by at least one crosspiece and, in order to construct a conduit section, said joining assembly is fixed on a rigid continuous slab resting on the ground and extending between the two profiled members while at the same time aligning said profiled members with those of the already laid part, parallel to the longitudinal axis, then the prefabricated elements forming the vault are laid by sealingly fixing the two lateral edges of the latter on the two longitudinal profiled members. When the profiled joining members are connected by a metallic plate, the latter advantageously forms a sacrifice formwork for the pouring of the slab.

The rigid slab may, however, also be made of concrete poured in situ as work progresses, the joining assembly being sealed in the upper face of the slab thus poured.

In this case, according to another advantageous embodiment, after preparing at the desired level a flat laying surface, the reinforcements of a slab are laid on said laying surface while at the same time placing therein the necessary inserts. Concrete is then poured between appropriate formworks consisting, possibly, of the walls of a trench, so as to construct a continuous slab in which the reinforcements are embedded. In the upper face of this slab there is then sealed a prefabricated joining assembly consisting of at least two longitudinal profiled members whose alignment is adjusted in accordance with the corresponding profiled members of the part already laid, the slab is optionally covered, between the profiled members, with a sealing plate, and then the prefabricated arched wall elements are laid in order to form a vault the lateral edges of which are connected tangentially to the two profiled members and said lateral edges are sealingly fixed to the corresponding profiled members.

BRIEF DESCRIPTION OF THE DRAWINGS

The invention will be better understood from the detailed description which follows of a number of embodiments given by way of examples with reference to the accompanying drawings.

FIG. 8 and FIG. 9 illustrate diagrammatically the various stages of construction of a conduit according to two alternate embodiments of the invention.

DETAILED DESCRIPTION

European Patent EP-0,188,487 by the same inventor, which has already been mentioned, describes a process for the construction of buried conduit consisting of adjacent sections arranged one behind the other on the flat, compacted bottom of a trench and each comprising a lower element forming an invert is laid on the ground and the edges of which form articulated bearing members for the lateral edges of an upper element arched in the form of a vault. The two elements are made of concrete, it being possible for the vault in particular to be deformed slightly so as to transmit laterally to the backfill some of the loads carried.

In the present invention, the conduit is likewise constructed in the form of juxtaposed sections, but a first major difference lies in the fact that the invert consists of a simple massive reinforced concrete slab 1 and the vault of an arched metallic wall 2, the lateral edges 21 of which are fixed, over their entire length, on profiled members 3 and 3' sealed in the slab 1.

Figure 1:
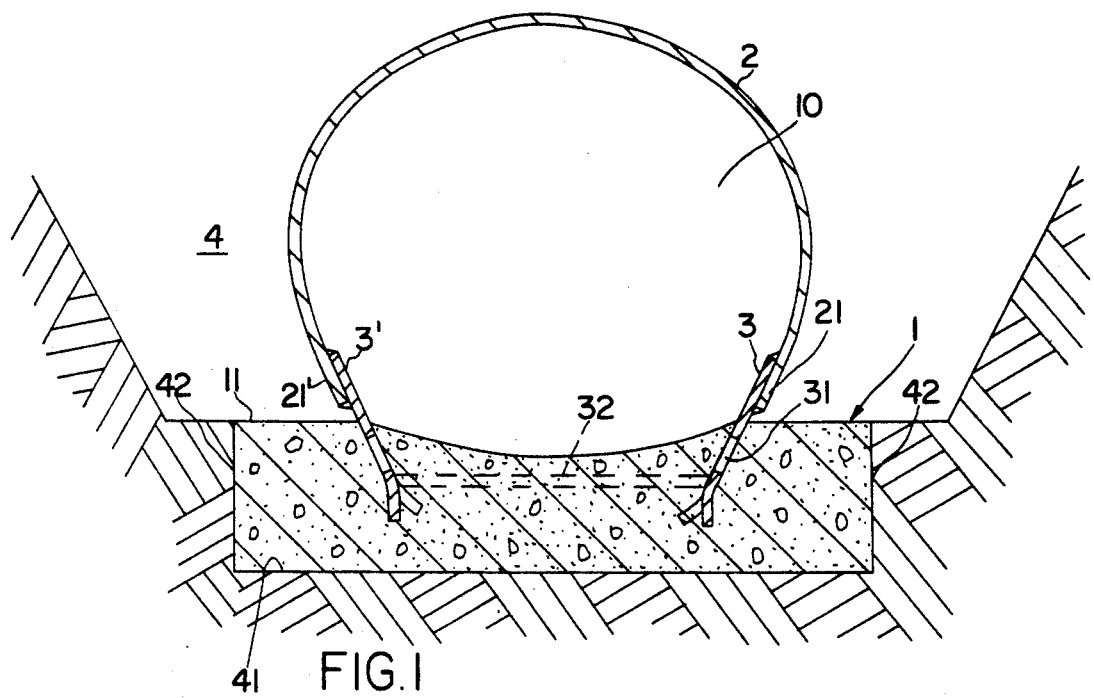
FIG. 1 is a cross section of a section of a conduit constructed according to the invention.
Figure 2:
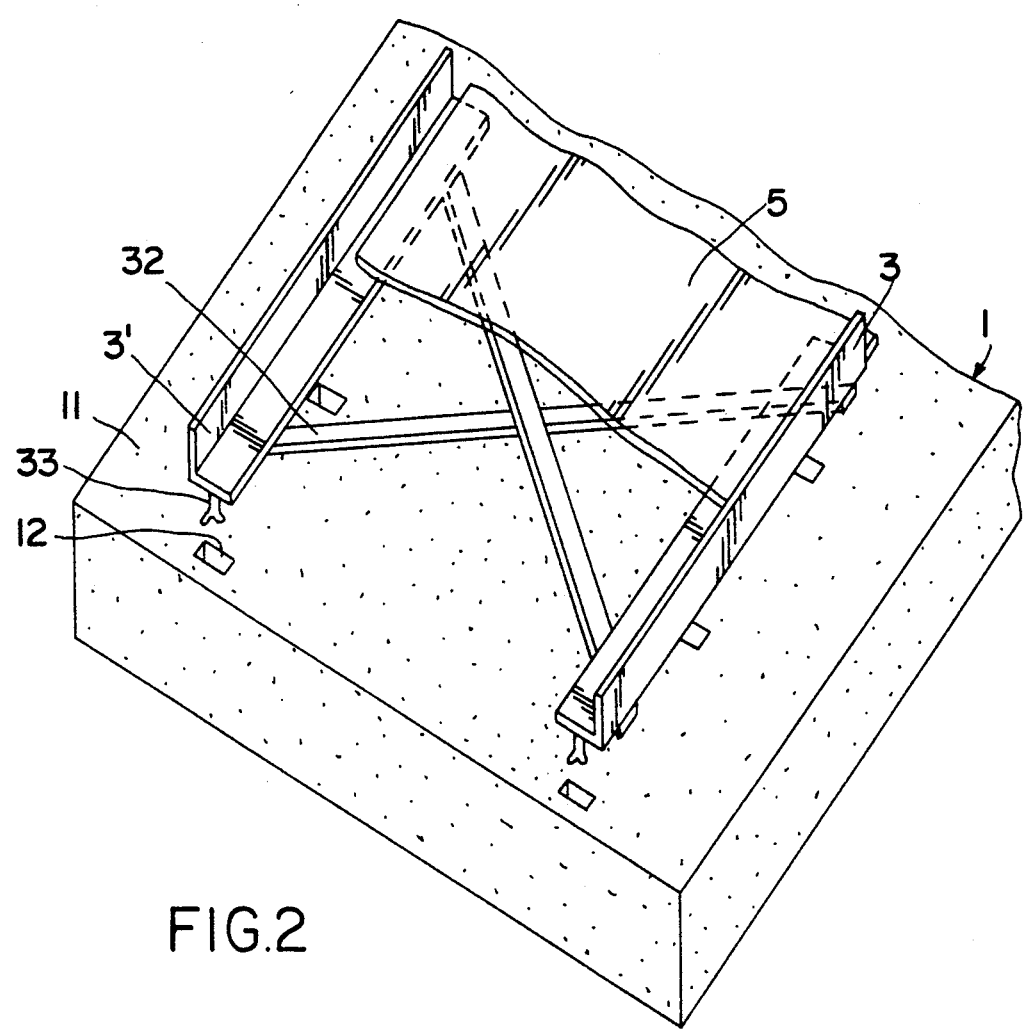
FIG. 2 illustrates in perspective a base element in an alternative embodiment.

The slab 1 may consist of prefabricated plane elements as illustrated in FIG. 2, or it may be directly poured in situ in a trench 42 as indicated in FIG. 1.

The longitudinal joining members 3 and 3' consist of metallic profiled members connected to one another by crosspieces which maintain their parallelism and the space between them.

In the simplest embodiment, illustrated in FIG. 1, the two profiled members 3 and 3' are simple sheet metal plates, the lower part of which is provided with anchors and which are embedded in slab 1, openings or notches 31 permitting the passage of the concrete for better sealing.

According to one of the essential features of the invention, the profiled members 3 and 3' are perfectly aligned, on laying, with the corresponding profiled members of the part of the conduit already constructed. Such alignment may, if desired, be performed during the embedding of the profiled members 3 and 3' in the still fresh concrete of the slab 1, the latter forming, after setting, a crosspiece for maintaining the space between and the parallelism of the profiled members 3 and 3'. However, it is preferable to adjust the parallelism of and the space between the profiled members in the workshop, the two profiled members 3 and 3' then being rigidly connected by metallic bars 32 forming crosspieces. The assembly is then laid on the slab 1 and aligned as one unit, the crossbars 32 being embedded in the slab 1.

In the embodiment of FIG. 2, the two profiled members 3 and 3' are angle brackets connected to one another by bars 32 and the assembly is laid on the slab 1 which consists of a prefabricated element provided, on its upper face 11, with recesses 12 formed during the pouring and into which anchors 33 integral with the angle brackets 3 and 3' penetrate.

If the slab 1 is prefabricated, two embodiments are possible.

Firstly, the profiled members 3 and 3, may be laid and embedded during the manufacture of the slab while adjusting their parallelism and the space between them. For example, the two profiled members 3 and 3' may be positioned on the bottom of the mold, the slab being poured upside down and then turned over.

It is, however, also possible to lay the profiled members on the already constructed slab, the latter being provided with recesses 12 dimensioned so as to leave a clearance. In this case, it is more advantageous to adjust beforehand the spacing and the parallelism of the profiled members 3 and 3' by means of the bars 32. The slab elements 1 are laid one behind the other on the bottom 41 of the trench 4, then the joining assemblies are laid, these consisting of the two profiled members 3 and 3' connected to one another. The alignment of the profiled members may be adjusted by virtue of the clearance left by the recesses 12, the profiled members subsequently being embedded.

Provided the liquid conveyed in the conduit is not corrosive to concrete and provided the latter is of sufficient quality to ensure leaktightness, the upper face 11 of the slab 1 may form directly the bottom of the conduit 10.

In many cases, however, it is preferable to cover the concrete with a plate forming a sealing skin.

In FIG. 2, for example, a plate 5 is placed between the two angle brackets 3 and 3'. In this case, the plate 5 forms a simple sealing skin applied on the upper face 11 of the slab 1 and does not bear any load. It may therefore consist of a thin sheet metal or even plastic plate. A cement slurry is advantageously poured between the plate 5 and the upper face 11 of the slab 1 in order to ensure that forces applied by the fluid pressure are transmitted to the slab.

However, it will be expedient to cause the plate 5 to act as a crosspiece by giving it the necessary rigidity.

Figure 3:
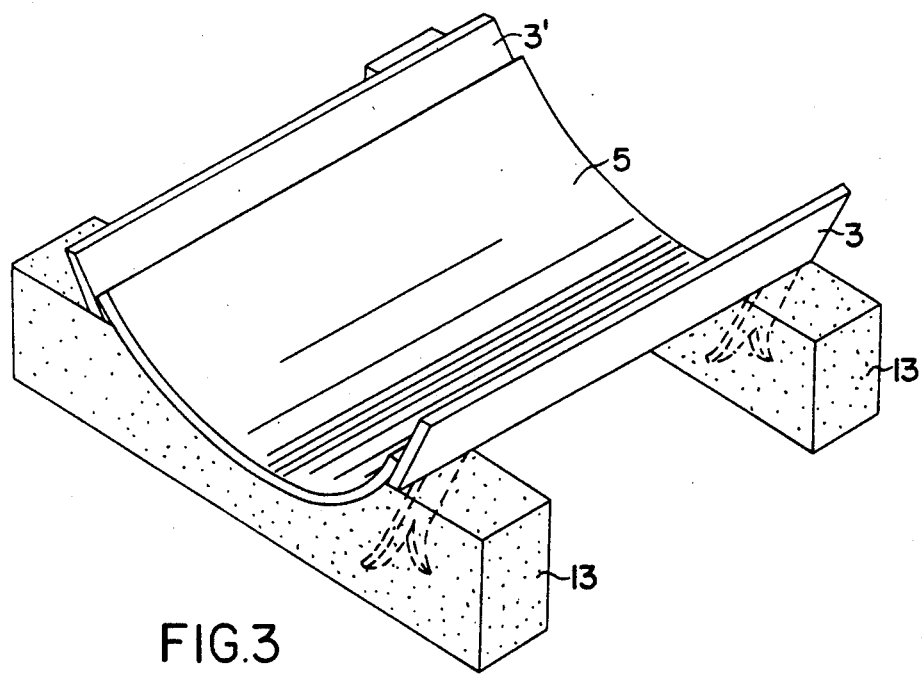
FIG. 3 illustrates in perspective another embodiment of the base.

This has been illustrated in FIG. 3. The plate 5, which has an incurved shape so as to form the bottom of the conduit 10, may consist of a thick sheet metal plate which is joined tangentially and is welded to the profiled members 3 and 3'.

The latter are embedded in two concrete beams 13, spaced apart from one another, which form with the plate 5 the crosspieces for maintaining the spacing and the parallelism of the profiled members 3 and 3'. A prefabricated assembly of sufficiently light weight to permit its handling by a crane, even if the dimensions are large, is thus obtained.

When the profiled members 3, 3' are connected by a plate, it is expedient to cause the latter to act as a permanent formwork. In fact, after fixing the profiled members 3, 3' on the plate 5 while at the same time adjusting their spacing and parallelism the assembly is turned over so as to form the bottom of a mold while at the same time associating lateral walls with the plate 5. The reinforcement is installed and then the concrete is poured. After setting, the assembly is removed from the mold and turned over and forms a one-piece base element. The same technique may be employed to construct separate beams instead of a continuous slab.

In order to construct a conduit, base elements thus constructed, such as that which is illustrated in FIG. 3, can therefore be placed one behind the other, the alignment of the profiled members 3 and 3' can be adjusted in the longitudinal direction of the conduit, and then the ends of said profiled members as well as those of the bottom plate 5 can be welded to the corresponding ends of the profiled members and of the bottom of the already laid adjacent element.

If the rigidity of the bottom 5 is sufficient, taking into account the pressure applied when in operation, the bottom can consist of prefabricated elements thus juxtaposed. But it is also possible to embed the joining beams 13 in concrete poured in situ so as to form a continuous slab.

The internal pressure applied by the fluid conveyed in the conduit 10 is supported, on the one hand, by the wall 2 in the form of a cylindrical sector and, on the other hand, by the slab 1. The latter is therefore subjected to bending stresses which it withstands particularly well by virtue of its concrete structure, the thickness and the reinforcement being determined easily as a function of the forces applied, which depend on the pressure and the dimensions of the conduit. In contrast, the upper wall 2 is subjected to tensile loads and may be made from arched sheet metal plates which form relatively light elements and can be stacked on top of one another to facilitate transportation.

Of course, the sheet metal plates forming the upper wall 2 must be treated also to resist corrosion. For example, after laying the conduit, a plastic protective product or even a simple mortar may be applied to the wall.

Owing to the fact that the joining members 3 and 3' consist of metallic profiled members, the lateral edges 21 of the vault 2 may be fixed by simple welding or bolting, with interposition of a leaktight seal if required. The same applies to the connection between the transverse ends of the plates 5.

Figure 6:
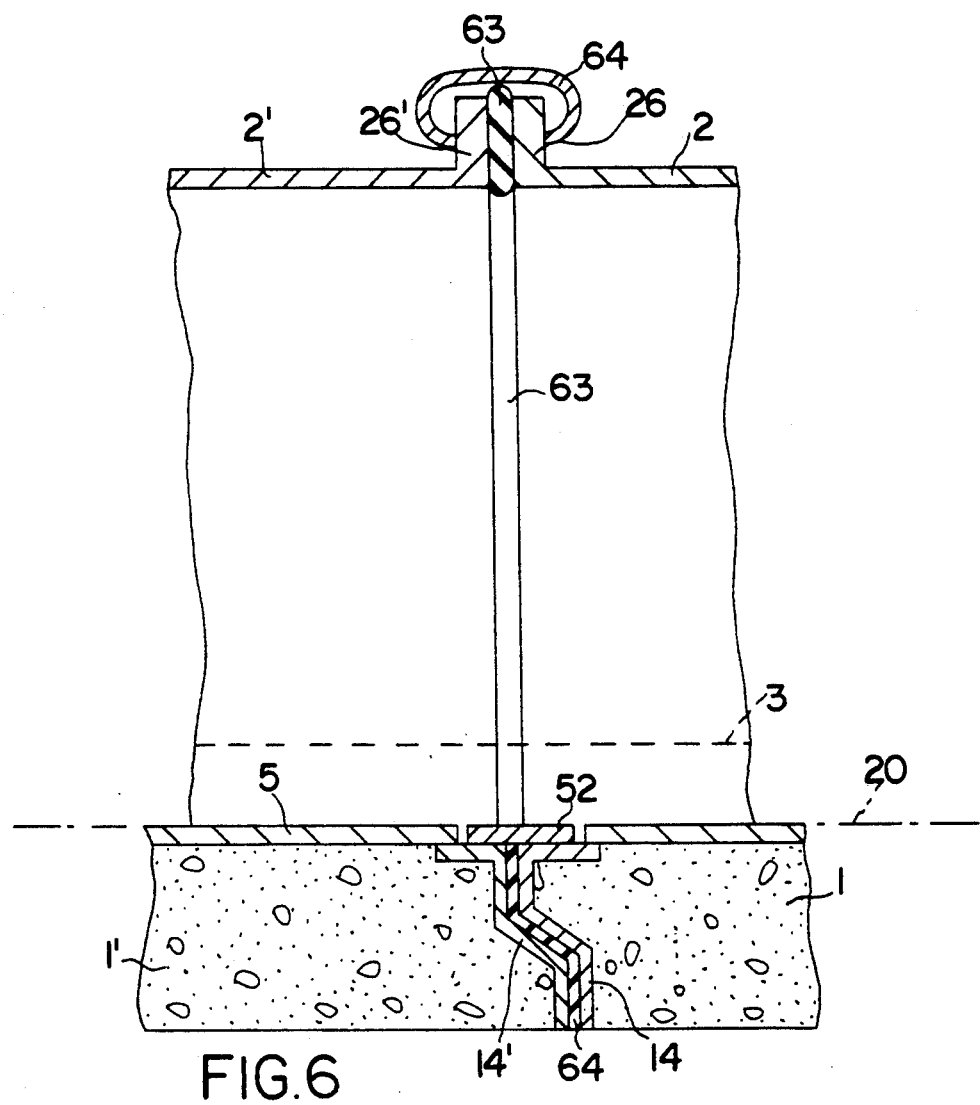
FIG. 6 is a longitudinal sectional view of a method of joining two consecutive sections.

However, it is also possible, as illustrated in FIG. 6, to provide at the ends of the consecutive elements 2, 2' annular flanges 26, 26', which are applied onto one another with interposition of a seal 63 made of neoprene or some other sealing material and clamped, for example, by stirrups 64 or clamping rods distributed over the periphery of the joint.

Figure 7:
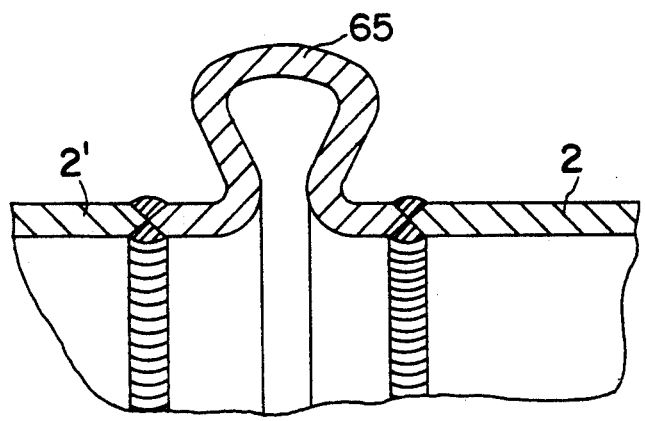
FIG. 7 illustrates diagrammatically, to an enlarged scale, another joining method.

Such a neoprene seal may be crushed slightly under the effect of the expansions but, if the latter are too great, it is possible, as illustrated in FIG. 7, to provide between two successive vault elements 2, 2' joints 65 of omega- or wave-shaped section, which make it possible to withstand expansions and which may be welded to the facing transverse ends of the two elements 2, 2' or fixed by any other means.

As can be seen in FIG. 6, when the base 1 consists of prefabricated elements, the junction of the transverse ends of the base elements 1 will advantageously be effected by fitting together, the facing ends of two adjacent slabs 1, 1' being provided with complementary projecting hollow parts which engage in one another.

In this case, it will be useful to place at the two ends metallic end pieces 14, 14' which make it possible to avoid damage during transportation.

A leaktight seal 64 is placed between the adjacent ends of the two elements 1 and 1', the assembly being covered with a junction plate 52 which ensures the continuity of the lower wall 5.

It will be noted that such an arrangement permits absorption of differential expansions.

Special parts could also be interposed between the longitudinal elements, for example, in order to effect changes in direction.

The arrangements which have just been described present numerous advantages over the techniques previously used for the construction of conduits under pressure.

In fact, compared with a circular metallic conduit, the invention permits a reduction of the overall height and a decrease in the stresses brought to bear upon the ground as a result of the concrete slab distributing the load. This slab also improves the resistance to longitudinal or transverse creeping effects as a result of the friction between the ground and the slab, the lower face of which may additionally be provided with anchoring parts. The concrete slab also facilitates the achievement of leaktightness between the various elements.

By use of the profiled joining members 3 and 3' embedded in the slabs 1, it is possible to ensure, on laying, the alignment of the elements forming the adjacent sections. In addition, compared with concrete conduits, the invention presents the advantage of using, in part, metallic elements, which are lighter and easier to handle and assemble.

It will be noted, furthermore. that the embodiment adopted permits modular construction, the thicknesses and the constitution of the upper sheet metal plate 2 and of the invert 1 being adaptable to the loads to be supported. For example, in the construction of a forced conduit, the thickness of the upper sheet metal plate 2 as well as the reinforcement and the thickness of the slab 1 and even its constitution can be varied as a function of the depth of water.

In fact, in the case of a conduit, and in particular a forced conduit, which extends over a great length in terrain, the level and nature of which may be very different, it is particularly expedient to adapt the constitution of the conduit to the operating conditions. For example, in certain types of terrain, it is preferable not to burden the conduit too heavily and to use preferably the embodiment of FIG. 3 in which the conduit is laid on spaced apart beams. By contrast, in other types of terrain, it will be necessary to increase the bedding surface of the conduit and possibly its weight, the concrete slab then acting as ballast permitting the retention of the conduit, for example when the latter is placed in the water table.

Another advantage of the invention lies in the fact that it permits rational and very rapid construction of the conduit. By way of example, FIGS. 8 and 9 show two construction processes adapted to the various embodiments which have just been described.

FIG. 8 applies to the construction of a conduit the lower part of which is poured in situ.

First of all, at (1), a trench 4 having a flat and compacted bottom 41 is dug at the desired level using appropriate earth moving machinery. As indicated at (2), a trench 42 in which the concrete will be poured directly may be formed in the bottom 41.

The third stage consists in laying the reinforcement 15 of the slab 1, which is prefabricated in the workshop and in which the necessary inserts will have been placed, for example end pieces 14 or tubes for the passage of prestressing rods.

In the fourth stage, the concrete is then poured and encases the reinforcements 14 to produce the slab 1, receptacles for the anchors of the profiled members 3, 3' being disposed therein, if appropriate. These profiled members, which are connected to one another by crossbars or by the plate 5, are laid on the slab, aligned with the already laid profiled members and then embedded as indicated at (5).

The slab 1 then forms an excellent runway on which may be placed a supporting member, such as a truck 16, which forms a gauge and is used for laying the vault elements 2, and which may possibly travel on the profiled members 3, as indicated at (6). Depending on the dimensions of the vault, it may consist of plates welded to one another, it being possible for the welding to be performed continuously and automatically by an apparatus carried, for example, by the supporting truck 16.

The members for clamping the transverse joints or the expansion joints 65 are installed and the vault is treated if necessary, for example in order to protect it against corrosion (Stage 7).

The conduit is then completed and, in an eighth and final stage, the already constructed part of the conduit may be buried under backfill 43.

It can be seen, therefore that it is possible to perform the various stages of the process as construction of the conduit progresses.

FIG. 9 shows the same process adapted for use with prefabricated elements.

After digging the trench 4, prefabricated base elements 1 each comprising two profiled members 3, 3' connected to one another by concrete beams 13 and, possibly, by a continuous plate 5 are placed on the bottom 41 covered with a blinding or sealing coat. The elements 1 thus formed may be handled and their position adjusted so as to achieve alignment of the profiled members 3 with those of the already constructed part.

The assembly is then embedded in concrete poured in situ and, after setting, a runway is available as before, on which a truck 16 facilitating the installation and the joining of the vault elements 2 may move. After applying the seal and an anticorrosion product, the assembly is covered with the slope 43.

Of course, the invention is not limited merely to the details of the various embodiments which have just been described by way of example.

In the case of FIG. 3, for example, the bottom 5 could consist of a thin concrete plate in which the profiled members 3 and 3' would be sealed.

Figure 4:
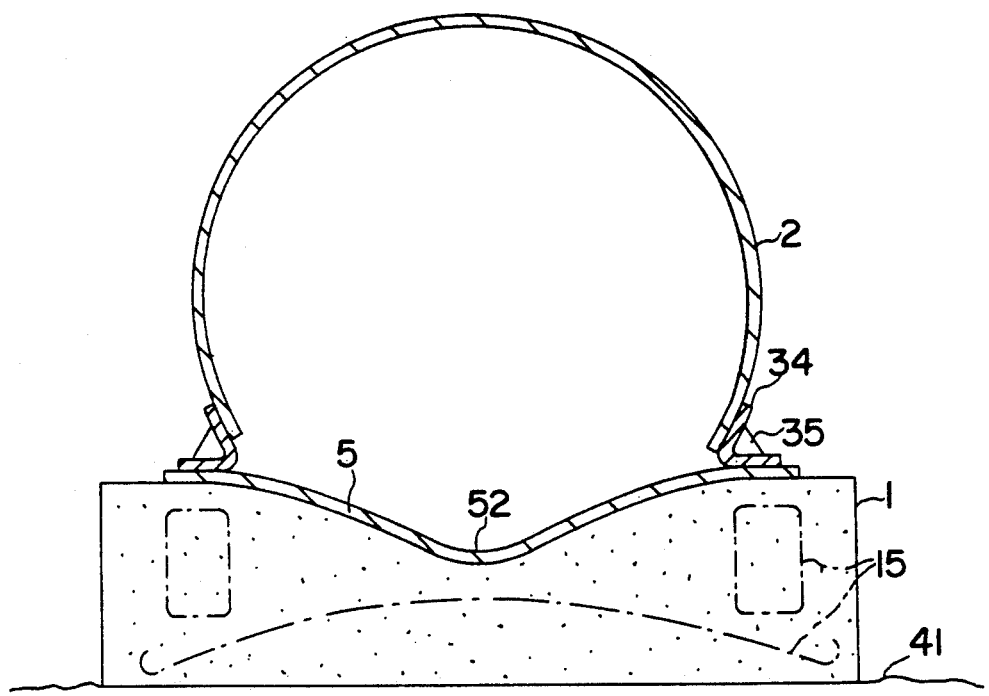
FIG. 4 and FIG. 5 show, respectively, in cross section two further embodiments of the invention.
Figure 5:
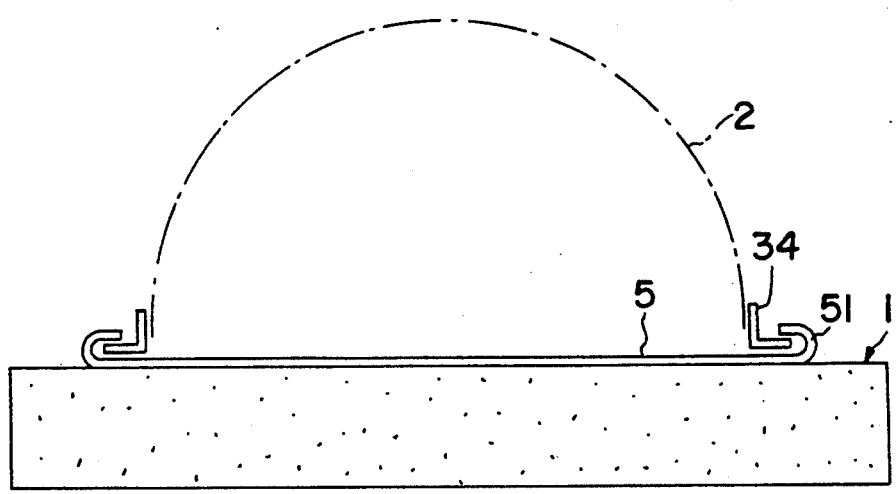

In addition, these profiled members may have various forms, two examples of which have been illustrated in FIGS. 4 and 5.

In the case of FIG. 4, the two profiled joining members are angle brackets 34 which have a horizontal face welded on the plate 5 and an inclined face which is directed tangentially to the vault 2 at the springing line thereof, it being possible for the angle brackets 34 to be optionally reinforced by gussets 35. The plate 5 which forms the upper face of the slab 1 may have any form which is adapted to the circumstances, for example it may be incurved to form a central channel 52.

FIG. 5, on the other hand, gives an example of a conduit with a semicircular profile, the profiled joining members consisting of right-angled corner brackets 34 fixed on the plate 5, the lateral edges of which may be folded over and welded so as to improve rigidity and leaktightness.

Figure 10:
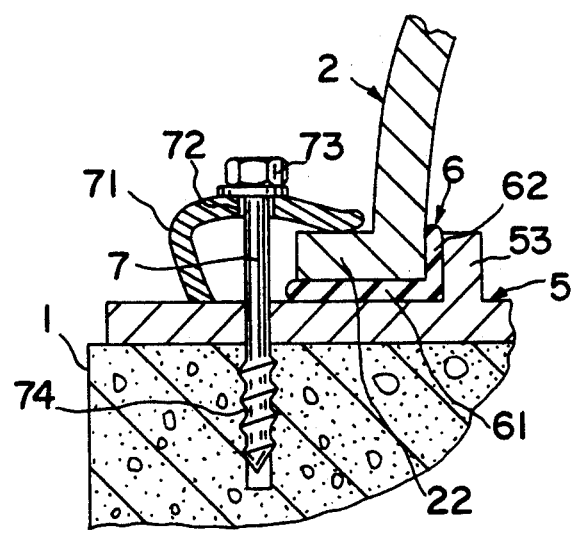
FIG. 10 is a detail view showing an alternative embodiment of the junction between the vault and the slab.

In other cases, each profiled member 3 and 3' could be replaced by a simple strip 53 disposed along the lateral edge of the plate 5, as illustrated in FIG. 10.

In this case, the lateral edges of the vault 2 are advantageously provided with flanges 22 and are wedged against the strips 53 A seal 6 having an L-shaped form and comprising a horizontal face 61 applied onto the wall 5 and a face 62 applied against the strip 53 is interposed between the vault 2 and the wall 5.

Provision could also be made for strips spaced apart from one another in order to facilitate centering of the flange 22.

FIG. 10 additionally illustrates a particular method of fixing the vault 2 on the slab 1 by means of clamping rods 7 regularly distributed over the entire length and associated with bearing plates 71 forming fastening claws.

Each claw 71 comprises, in fact, a heel which bears outwardly against the sheet metal plate 5 or against the slab 1 and a free end which bears against the flange 22 and is pierced in its central part by an orifice 72 through which the rod 7 passes, the latter advantageously being formed in the manner of a foundation bolt comprising a head 73 bearing against the claw 71 and an end 74 screwed into an orifice disposed in the slab and provided with a corresponding internal thread constituted, for example, by a metallic strip wound into a spiral and anchored in the concrete. Each claw 71 has a slightly arcuate form and is composed of elastically deformable steel. The clamping of the flange 22 is thus effected in a manner similar to that which is customarily used for fixing railroad rails in particular on concrete ties.

Such resilient clamping of the leaktight seal 6 permits absorption of the deformations resulting, for example, from thermal stresses and also variations in pressure resulting, for example, from water hammer.

Figure 11:
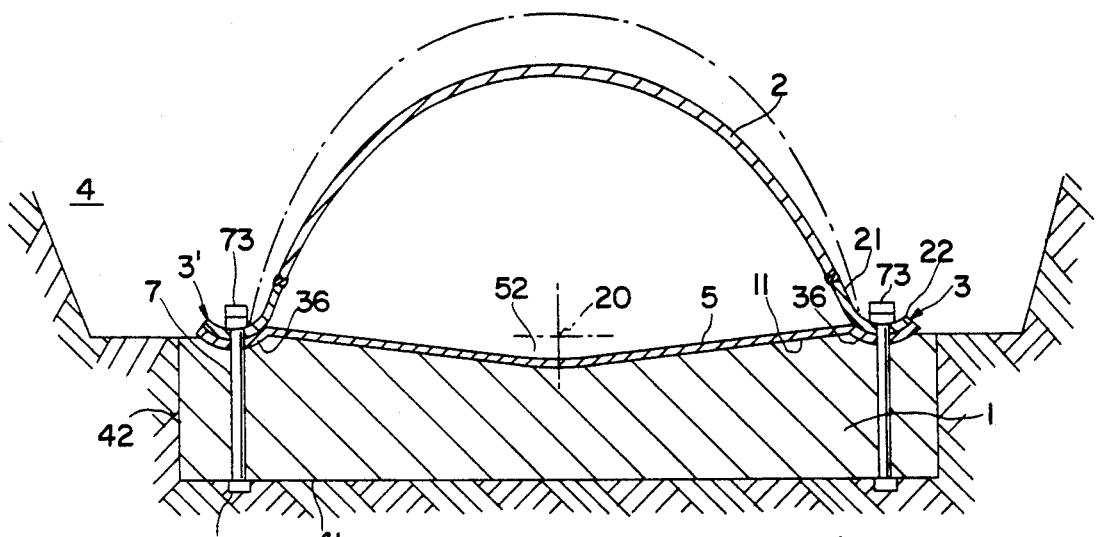
FIG. 11 shows, in cross section, another embodiment of the invention.
Figure 12:
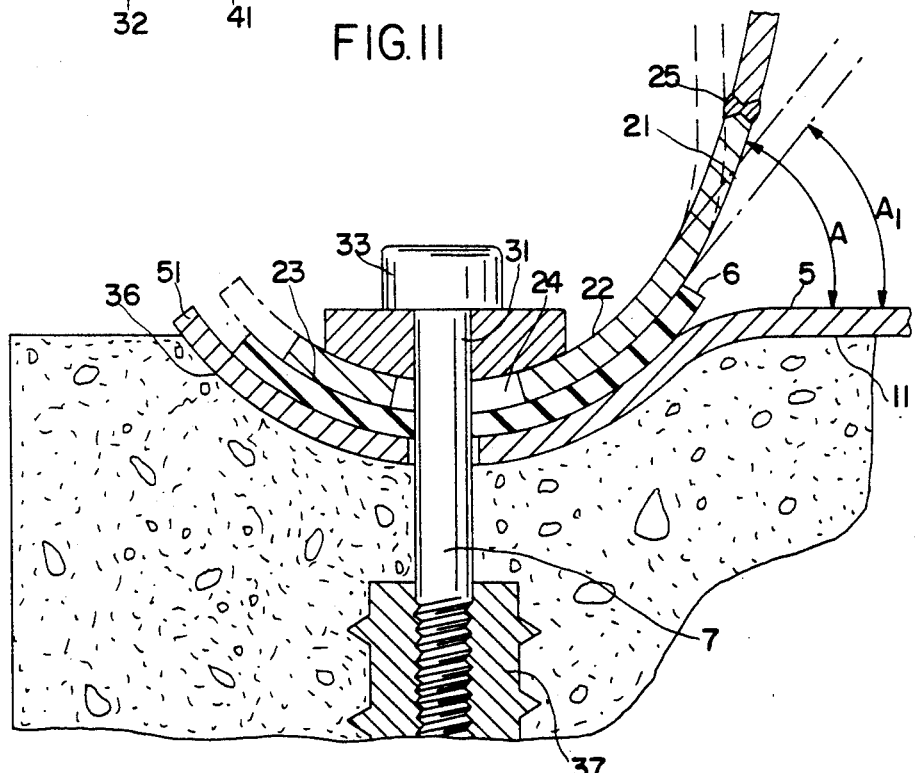
FIG. 12 is a detail view of the junction between the vault and the slab in the embodiment of FIG. 11.

FIGS. 11 and 12 show another embodiment, which is particularly advantageous.

In this case, the profiled joining members 3 and 3' consist of incurved parts in the form of grooves 36 which are upwardly concave and disposed on the lateral edges of the plate 5.

The two lateral edges 21 of the upper wall 2 are likewise incurved so as to form flanges 22 of opposite profile, downwardly convex, which may be applied onto the concave grooves 36.

A leaktight seal consisting of a flat ribbon 6 made of viscoelastic synthetic material is interposed between each groove 36 and the corresponding flange 22.

The flanges 22 are fixed on the slab 1 by a plurality of rods 7 distributed regularly over the length of the upper element and tightened by a head 73 bearing against the flange 22 and by their lower end 74 bearing against the slab 1.

In the embodiment of FIG. 11, for example, the rods 7 pass through orifices disposed at regular intervals in the slab 1 and bear via a lower head 32 against the lower face of the slab 1 and via an upper head 73 against the flange 22, it being possible for the rod to be tightened in any known manner. The rods 7 may, however, also be embedded in the slab 1 beforehand, during the pouring of the latter, and include a threaded upper end on which a nut is screwed, it being possible for the tightening again to be effected in a known manner for prestressing concrete.

The rod 7 may also be screwed, in the manner of a foundation bolt, into an insert 37 which is internally threaded and embedded in the slab 1 as illustrated in FIG. 12.

The upper vault 2 may consist, depending on its dimensions, either of a single element constructed by bending or stamping while at the same time disposing the gutterlike flanges 22 at its ends, or, for large sizes, of a plurality of plates welded to one another.

In particular, the ends 21 of the vault 2 on which the rounded flanges 22 are disposed may consist of separate elements having, in transverse section, the form of a crook and forming margins on which the lateral edges of the vault 2 are fixed, the facing ends being chamfered in order to achieve weld 25.

As indicated in FIG. 12, by virtue of the circular form of the flanges 22 and their bearing grooves, it is possible to cause the flange to slide on its seat so as to modify its orientation by providing, for example, holes 24 of elongated section for the passage of the clamping rods 31. In this way, it is possible to vary the angle of inclination A of the rectilinear part 21 which extends the flange 22 upwards and forms the springing line of the vault, e.g., to angle $A_1$. As illustrated in FIG. 12, it is thus possible, without modifying the width between the bearings 22, to vary the profile of the vault and consequently the cross section of the conduit.

Such an embodiment of the profiled members 3, 3' for joining the margins in the form of separate parts has another advantage.

It has been determined that the parts of the vault subjected to the greatest stresses are precisely the margins by which it is fixed to the lower slab 1. If the margins consist of separate profiled members 3, their thickness and, for example, the nature of the metal employed to withstand the loads applied may be determined easily and a thickness and, where appropriate, a different kind of metal may be chosen for the vault 2.

It is thus possible, for example, to standardize parts and to have available prefabricated profiled members intended for given loads per linear meter, for example: 1 T/lm, 2 T/lm, 5 T/lm, 10 T/lm, etc., and preformed vaults of different thickness and dimensions, and, depending on the internal pressure, the diameter of the vault and the width between the margins, it is possible to calculate the stresses applied on the vault and on the margins, respectively, and to associate margin elements and vault elements capable of withstanding these stresses.

It is also possible to reinforce the margins 51 of the sealing wall 5 as a function of the stresses applied.

In other cases, however, it will be possible on the other hand to use more economical embodiments; for example, in the case of FIG. 1, the profiled joining members 3 and 3' could consist of simple plates such as those used for the construction of temporary airstrips.

It can be seen that the invention may form the subject of a number of embodiments, making it possible to meet a wide variety of operating conditions.

Furthermore, although it is natural to give the upper element 2 a semicircular form, other forms could be adopted as a function of the operating conditions, in particular the internal pressure and the space requirement which may have to be fulfilled, as well as the flow rate to be ensured.

What is claimed is:

1. A conduit for large section intended to be laid on a ground surface for conveying a fluid under high pressure, said conduit being formed by assembling longitudinal sheet metal plates delimiting an elongated tubular space which is tightly closed and adapted to resist an internal pressure in excess of 10 bars, said tubular space having a truncated circular cross-section, said conduit comprising (a) a lower flat base constituted by a reinforced concrete slab resting on said ground surface, a thickness and reinforcement of said slab being determined as a function of forces applied depending on pressure and dimensions of said conduit;

(b) an upper part forming a vault covering a circular sector between two lateral edges and constituted by assembled incurved metal plates;

(c) two longitudinal joining members respectively for tightly joining each of said lateral edges of said vault to said lower flat base;

(d) each of said joining members being constituted by a profiled metallic plate having an upper part and a lower part;

(e) said upper part of each of said joining members being so oriented as to form a springing line of said vault and being welded along a corresponding said lateral edge of said vault;

(f) sealing means and fixing means between said lower part of each of said joining members and said lower flat base, said sealing and fixing means being adapted to withstand stresses applied as a function of internal pressure in the dimensions of said conduit.

2. A conduit as claimed in claim 1, wherein an upper face of said slab is covered by a metallic plate extending between said two joining members and welded to said slab for tightly closing said conduit.

3. A conduit as claimed in claim 1, wherein said joining members are embedded in an upper face of said slab.

4. A conduit as claimed in claim 1, wherein said slab in poured in situ.

5. A conduit as claimed in claim 1, wherein said slab is a prefabricated element.

6. A conduit as claimed in claim 1, wherein said slab is covered by a thin wall extending between said two joining members and forming a sealing skin.

7. A conduit as claimed in claim 6, comprising a cement slurry placed between said sealing skin and an upper face of said slab in order to ensure distribution over an entire surface of said slab of forces applied on said thin wall.

8. A conduit as claimed in claim 1, wherein said two joining members are embedded in at least two reinforced concrete beams functioning as crosspieces for maintaining said joining members and as stands for positioning a base of said conduit.

9. A conduit as claimed in claim 8, wherein after laying, said positioning beams are embedded in concrete poured in situ.

10. A conduit as claimed in claim 1, wherein each of said joining members consists of an angle bracket comprising a substantially horizontal wing for attachment to said slab and a wing directed tangentially to a lateral edge of said vault.

11. The fluid-conveying conduit as claimed in claim 2, wherein said metallic plate is rectangular and has two lateral edges parallel to a longitudinal axis of said plate, said lateral edges comprising two upwardly concave grooves which form said longitudinal joining members, said vault being provided along its two lateral edges, respectively, with two flanges having a profile complementary to a profile of said upwardly concave grooves and adapted to engage in said concave grooves with interposition of a leaktight seal, each of said flanges being associated with clamping means distributed over an entire length of said flanges, said clamping means having a first side bearing against said flange and a second side bearing against said slab.

12. A conduit as claimed in claim 11, wherein said flanges are disposed on separate margin parts having a transverse section in a form of crook and comprising a rounded gutterlike part forming a fixing flange and extended by a rectilinear part, and wherein said vault consists of at least one arched plate fixed along two lateral edges respectively on ends of said rectilinear parts of said margin parts.

13. A conduit as claimed in claim 12, wherein orientation of said margin parts may be adjusted before fixing of said vault by rotating rounded parts of said flanges on said concave grooves so as to vary an inclination (A) of said rectilinear part with respect to said slab and consequently a cross section of said conduit.

14. A conduit as claimed in claim 12, wherein dimensions and mechanical specifications of both said joining members and margin parts and of said plates forming said vault are predetermined as a function of specific stresses to which said parts are to be subjected.

15. A conduit as claimed in claim 11, wherein each of said concave grooves is defined by at least one rectilinear strip parallel to said longitudinal axis, for inwardly wedging each lateral edge of said vault.

16. A conduit as claimed in claim 11, wherein said leaktight seal between each flange of said vault and a corresponding groove consists of an L-shaped ribbon having a horizontal wing interposed between said flange and a corresponding face of said groove and a vertical wing applied against a centering strip.

17. A conduit as claimed in claim 1, wherein opposite transverse ends of two successive vaults are connected by an annular joint forming, in transverse section, at least one wave which permits longitudinal expansion of said vault.

18. A conduit as claimed in claim 1, wherein said tubular space has a semi-circular cross-section.

19. A conduit of large section intended to be laid on a ground surface for conveying a fluid under pressure, said conduit being formed by assembling longitudinal sheet metal plates delimiting an elongated tubular space which is tightly closed and adapted to resist an internal pressure in excess of 10 bars, said tubular space having a truncated circular cross-section, said conduit comprising:

(a) an upper part forming a vault covering a circular sector between two lateral edges and constituted of assembled incurved metal plates;

(b) a bottom constituted by a substantially flat metal plate which is applied to a base constituted by a reinforced concrete slab resting on said ground surface, said plate having two lateral edges respectively welded to two joining members;

an upper part of each joining member being so oriented as to form a springing line of said vault and being welded along the corresponding lateral edge of said vault;

(d) means for attaching a lower part of each joining member to said concrete slab;

(e) dimensions and structural specifications of said vault, said joining members, said attachment means and said concrete slab being predetermined for withstanding stresses resulting from internal pressure and dimensions of said conduit.

20. A conduit as claimed in claim 19, wherein the lower part of each joining member is embedded in said concrete slab forming said lower flat base.

21. A conduit as claimed in claim 19, wherein the lower part of each joining member is applied to a face of said lower flat base, said attaching means bearing on said lower part and being regularly distributed over the entire length of said lower part.

22. A method for constructing a conduit of large section for conveying a fluid under a pressure in excess of 10 bars, said conduit extending along a longitudinal axis and being formed by assembling, in situ, longitudinal sheet metal plates delimiting a tightly closed elongated tubular space, said tubular space having a cross-section comprising an upper part forming a vault covering a circular sector between two lateral edges and a substantially flat bottom, said metod comprising the steps of (a) constructing a lower flat base constituted of a reinforced concrete slab resting on a ground surface and having an upper face constituting said flat bottom, thickness and reinforcement of said slab being determined as a function of forces depending on pressure and dimensions of said conduit;

(b) laying on said base two longitudinal joining members each constituted by a profiled metallic plate having an upper part and a lower part, said upper part of each joining member being so oriented as to form a springing line;

(c) aligning successive joining members with previously laid joining members;

(d) sealingly fixing a lower part of each of said joining members with said concrete slab; and (e) laying and welding to one another said sheet metal plates to form said vault, said lateral edges of said vault being tangentially connected and welded respectively with said upper parts of said joining members.

* * * * *